United States Patent [19]
Nelle et al.

[11] Patent Number: 6,163,970
[45] Date of Patent: Dec. 26, 2000

[54] LINEAR ENCODER WITH A MODULAR SCALE AND A METHOD OF PRODUCING SAME

[75] Inventors: Günther Nelle, Bergen; Werner Jung, Traunreut, both of Germany

[73] Assignee: Dr. Johannes Heidenhain GmbH, Traunreut, Germany

[21] Appl. No.: 09/090,714

[22] Filed: Jun. 4, 1998

[30] Foreign Application Priority Data

Jun. 12, 1997 [DE] Germany .............................. 197 24 732

[51] Int. Cl.⁷ .............................. B43L 7/00; B32B 7/04; B32B 7/14; B23K 5/22
[52] U.S. Cl. .............................. 33/482; 33/493; 33/492; 33/706; 33/708; 29/428; 156/91; 156/291; 156/330; 228/212
[58] Field of Search ........................... 156/91, 291, 330; 228/212; 29/428; 33/708, 493, 492, 483, 706, 707

[56] References Cited

U.S. PATENT DOCUMENTS 4,160,328 7/1979 Ernst .............................. 33/706
4,569,137 2/1986 Ichikawa .............................. 33/706

FOREIGN PATENT DOCUMENTS

| 1548875 | 10/1970 | Germany . |
| 1773460 | 9/1971 | Germany . |
| 2505587 | 8/1976 | Germany . |
| 2730715 | 2/1978 | Germany . |
| 2727769 | 5/1978 | Germany . |
| 3302643 | 8/1984 | Germany . |
| 3818044 | 11/1989 | Germany . |

*Primary Examiner*—Randy W. Gibson
*Attorney, Agent, or Firm*—Brown & Wood, LLP

[57] ABSTRACT

A linear encoder including a modular scale having at least one support and a plurality of graduation carriers mounted on the support and arranged one behind another in a longitudinal direction, with the support and the graduation carriers having substantially same coefficients of thermal expansion, and with the graduation carriers having knife-shaped butt junction surfaces, the linear encoder further having a measuring head for scanning the scale.

25 Claims, 4 Drawing Sheets

LINEAR ENCODER WITH A MODULAR SCALE AND A METHOD OF PRODUCING SAME

BACKGROUND OF THE INVENTION

1. Field of the Invention

The present invention relates to a linear measuring system including a modular scale having support means and a plurality of graduation carriers mounted on the support means and arranged one behind another in a longitudinal direction, with the support means and the graduation carriers having substantially same coefficients of thermal expansion; and a measuring head for scanning the scale.

The present invention also relates to a method of manufacturing such a linear measuring system.

2. Description of the Prior Art

German Patent No. 1,773,460 disclose a particularly long modular scale formed of several shorter scales. The drawback of this modular scale consists in that at butted locations of the shorter scales, which are arranged in a row one after another, the gap between the adjacent shorter scales cannot be precisely determined and, therefore, the results of the measurement are imprecise. To eliminate this imprecision, two scanning heads for scanning the scale are provided, which are fixedly connected with each other with a predetermined distance therebetween. Further, there is provided switch means which are controlled by evaluation electronic means and with which scanning with one head is switched to scanning with another head when the scanning unit approaches a butt joint. The switching is effected with actuation means provided on both sides of the butt joint of two scales which actuate the switch means. The switching is affected in such a way that scanning with a head, which finds itself a short distance in front of the butt joint in the movement direction of the scanning unit, is switched to scanning with a head which is located a short distance behind the first head. The gap width is determined by the evaluation electronic means in accordance with the switching data.

The drawback of this solution consists in that additional switching and actuation means need be provided. Further, two scanning heads with predetermined distance therebetween need also be provided. Still further, even with the use of these additional means, the measuring results can still be imprecise, in particular with small graduation periods of the graduation. The imprecision is caused by mechanical switching which, because of scattering of the switching time points and the use of actuation means, is not precise.

German Patent No. 2,730,715 likewise discloses a linear encoder with a scale formed of several shorter scales. As in German Patent No. 1,773,460 discussed above, there is provided a scanning unit with two scanning heads spaced from each other by a predetermined distance, with switching of scanning from one head located closer to a butt joint to another head located behind the first head, and with evaluation of the switching results by an electronic unit. The linear encoder of German Patent No. 2,730,715 differs from that of German Patent No. 1,773,460 in that the switching is effected not with mechanical means but with electronic means comprising a synchronization track provided on the scale, which track is scanned with special scanning means in order to detect the switching time points.

This linear encoder has substantially the same drawbacks as the linear encoder of German Patent No. 1,773,460, with the only difference that instead of mechanical switching means, actuation means of German Patent No. 1,773,460, electronic switching means in the form of a synchronization track and special scanning means are used.

A linear encoder with a scale formed of a plurality of shorter scales is also disclosed in German document No. 3,818,044. In the linear encoder of this document, the butt joint of the scale are defined by special coded fields the length of which is larger than the length of a conventionally used coded field. When such longer coded field is detected, it is evaluated. In this linear encoder, also two scanning heads are provided with switching from one head to another at a butt joint of two adjacent shorter scales to obtain necessary data.

The drawback of this linear encoder consists in that additional coded fields having an increased length need be used to enable a detection of a butt joint, and in that at least two scanning heads, switching means and evaluation electronics are required.

German Patent No. 1,548,875 discloses a linear encoder in which the scale is formed of a plurality of foil elements provided with graduation, which are glued in a groove formed in a support, with the longitudinal sides of the foil elements being welded to the support. This should insure that a long lasting, constant and precise gap is retained at the butt joint which is equal to an integral multiple of a graduation period.

The drawback of this linear encoder consists in that the heat generated at the welding points deforms the foil elements. Further, imbedding of the foil elements into a groove, which is formed in the support, complicates the welding process because when the welding energy is fed perpendicular to the supports, either the foil elements should be melted through their entire thickness or the support should be melted along an entire height of the groove at a predetermined region. If the welding energy is not fed perpendicular to the support, the welding process becomes very complicated and expensive. A further drawback consist in that with the edge of the graduation carrier being welded with the edge of a support groove, a relatively large amount of the welding energy is carried away from the support. Therefore, in order to obtain a desired welding connection, a relatively large amount of welding energy need be supplied, which results in the deformation of the graduation carrier which can make it unusable.

German document No. 2,727,769 discloses a sealed linear encoder in which the graduation carrier, the support and the hollow section, which insures sealing of the linear encoder, are formed of a plurality of separate sections arranged in a row one after another. At that, the graduation carrier is fixed to the support, with the support being floatingly arranged in the hollow section. To provide a gap width equal to a integral multiple of a graduation period between two adjacent sections, corresponding adjusting screws are provided in the support. The separate sections are connected with each other with a certain pre-load which is insured by spring means.

The drawback of this encoder consists in that the use of adjusting screws is required in order to provide a gap of a predetermined width equal to an integral multiple of a graduation period at a butt location. A further drawback consists in that the adjustment of the gap width is effected only during the assembly of separate sections with each other. That means that the adjusting cannot be effected during manufacturing.

German document No. 2,505,587 discloses a linear encoder in which the graduation is provided on a single surface of a bending-resistant hollow body with which the linear encoder is sealed. The graduation is secured to the hollow body with a highly elastic, thin, intermediate layer. Thereby, generation of constraining forces is prevented, which may result from different coefficients of thermal expansion of different elements of the encoder.

German document No. 3,302,643 discloses a clamping device for a linear measuring system with a measuring standard carrier being secured to the bearing surface of a measured object with at least one clamp which engages in a side groove provided in the carrier. The clamp has three projection one of which engages in the groove, the other of which is supported on the bearing surface, and the third one serves for supporting the carrier. At that, during the attachment of the clamp, a slight tipping of the clamp is possible.

The drawback of this system consists in that the bearing surface of the object has to be of a high quality, and that the entire bottom surface of the carrier should abut the object, with the both bottom surface of the carrier and the clamp support surface of the carrier being also of high quality.

Accordingly, an object of the present invention is a linear measuring system having a modular scale and a method of producing such a system both of which are simple and cost-effective.

Another object of the present invention is a linear measuring system and a method of producing the same which would insure obtaining error-free results with the graduation having a small graduation period.

SUMMARY OF THE INVENTION

These and other objects of the present invention, which will become apparent hereinafter, are achieved by providing graduation carriers having knife-shaped butt surfaces, and by providing a method including elastically connecting the graduation carrier with the support means, adjusting the position of carriers relative to each other, and by further fixedly connecting the graduation carriers with the support means so that their connection is characterized by a high modulus of elasticity.

The advantage of the linear measuring system according to the present invention consists in that the graduation carriers are fixedly attached to the support which insures a mechanically stable connection even with a long scale. The side surfaces of the graduation carriers are knife-shaped so that abutting surfaces of adjacent graduation carriers are very small. Thereby, practically no separation of the graduation at the butt joint occurs when the knife-shaped butt surfaces of the graduation carriers are so formed that the upper surface of the graduation carriers, on which the graduation is provided, has the largest longitudinal extension, in other words, is the longest surface of the graduation carrier.

When a plurality of supports is provided, the graduation carriers are so connected with the supports that the butt joints of the graduation carriers and the butt joints of the support are spaced from each other to a greatest possible extent. Thereby, a particularly large mechanical stability is achieved even if the scale has a very large length.

The advantage of providing knife-shaping butt surfaces of the graduation carriers consists in that they can be attached to each other so that the gap at the butt joint is very small. Further, the glue can accumulate in the free space between adjacent graduation carriers, with the glue being hardened upon pushing the graduation carriers toward each other during the adjustment of the gap. Thereby, widening of the gap between two graduation carriers as a result of glue accumulation during the adjustment and soiling of the graduation is prevented.

The advantage of the method of producing a linear measuring system according to the present invention consists in that first, an elastic connection of the graduation carriers with the support or support is formed. Thereafter, the adjustment of the gap between adjacent graduation carriers takes place, which is possible due to the existing elastic connection between the graduation carriers and the support(s). The adjustment under these conditions enables a precise adjustment of the gap width. A further connection between the graduation carriers and the support(s) is effected preferably in the regions of the butt joints. The further or second connection permanently fixes the gap width. The elastic connection between the support and the housing or the measured object enables different thermal expansions of the scale and the housing or the measured object, which prevents the generation of constrained forces.

BRIEF DESCRIPTION OF THE DRAWINGS

The features and objects of the present invention will become more apparent, and the invention itself will be best understood from the following detailed description of the preferred embodiments when read with reference to the accompanying drawings, wherein:

FIG. 3b is a cross-sectional view of the scale shown in FIG. 3a;

FIG. 4b is a cross-sectional view of the connection shown in FIG. 4a;

FIG. 5b is a cross-sectional view of a connection shown in FIG. 5a;

DETAILED DESCRIPTION OF THE PREFERRED EMBODIMENTS

Figure 1:
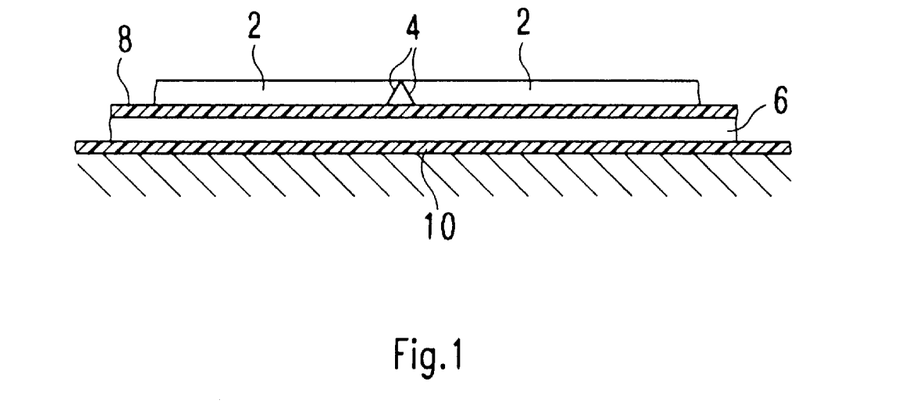
FIG. 1 is a schematic view illustrating a glue connection between a modular scale and a support.

A modular scale according to the present invention, which is shown in FIG. 1, consists of a plurality of graduation carriers 2 the upper surface of which has a graduation (not shown). The graduation carriers 2 have, in the area of their butt joints where they are connected with adjacent graduation carriers 2 at their side surfaces 4 which insure that their upper surfaces and, thus, the graduations remain unchanged. The side surfaces 4 form a triangular hollow space in the bottom of the graduation carriers 2. Opposite side surfaces of the adjoining graduation carriers 2 do not abut each other along their entire side surfaces but only along a narrow strip at their upper portions. The side surface 4 of the graduation carrier 2 is knife-shaped, so that abutting each other side surfaces 4 of the adjacent graduation carriers 2 have a linear contact at their respective graduation-carrying upper surface portions. Due to knife-shaped side surfaces, the graduation carrier 2 has a trapezoidal contour, as can be clearly seen in FIG. 2. This provides for a simplified formation of the side surfaces of the graduation carriers 2, while insuring simultaneously a minimal gap between the graduations on the upper surfaces of the graduation carriers 2.

The graduation carriers 2 are connected with a support 6 by a connection 8. This connection, in particular during the manufacturing process, is formed as an elastic connection. Subsequently, it is transformed into a stationary connection with a high modulus of elasticity. This stationary connection results in that the graduation carriers 2 and their support 6 have at least similar coefficients of thermal expansion. Such a connection can be formed by using a slow hardening glue, e.g., an epoxy glue. This glue connection is still characterized by elastic properties at the time the graduation carriers 2 and their support 6 are joined together, but it is then hardened after some time period or by being irradiated with UV-rays. As a result, a stationary connection having a high modulus of elasticity is formed. The stationary of fixed connection of the graduation carriers 2 with the support 6 results in formation of a scale or a measuring standard.

The support 6 is subsequently connected with a measured object e.g., a machine bed of a machine-tool. The connection between the support and the machine bed, which is further referred to as connection 10, is formed as an elastic connection in order to compensate for a different thermal expansion of the scale and the measured object. The elastic connection 10 permits to eliminate any constraining force which may result in the damage of the measuring object and/or of the scale. When the scale and the measured object have the same or similar coefficients of thermal expansion, the connection 10 can be so formed that any displacement of the scale and the measured object relative to each other would be impossible.

Figure 2:
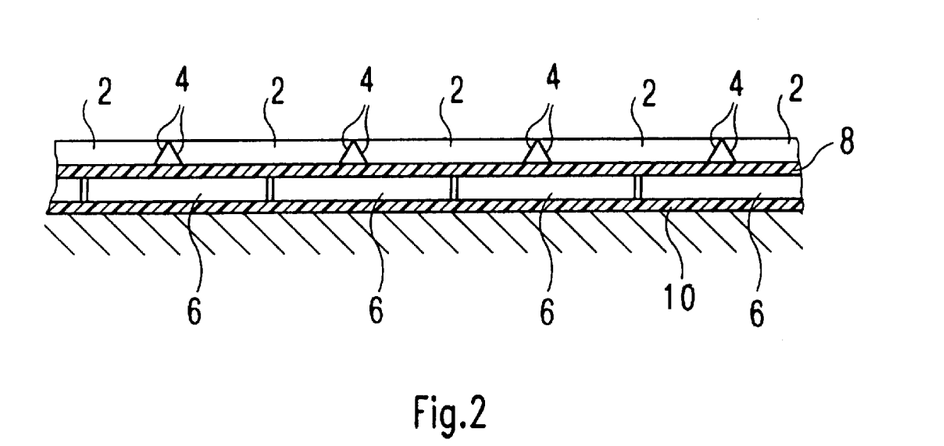
FIG. 2 is a schematic view illustrating a glue connection of a modular scale with a plurality of supports.

FIG. 2 shows a scale similar to that of FIG. 1. As in the scale shown in FIG. 1, the graduation carriers 2 are provided with graduations on their upper surfaces, and their side or butt surfaces are knife-shaped in such a way that adjacent graduation carriers 2 abut each other along narrow strips at their upper surface portions. The graduation carriers 2 are connected with the supports 6 by appropriate connections 8.

The scale shown in FIG. 2 differs from that of FIG. 1 in that there are provided a plurality of supports 6. At that it is important that the butted locations, where adjacent supports 6 abut each other, are spaced as much as possible from the butted locations where the adjacent graduation carriers 2 abut each other. With the length of the graduation carriers 2 and the supports 6 being the same, it means that the butted location of two supports 6 would lie approximately in the middle of a respective graduation carrier 2, and the butted location of two graduation carrier 2 would lie approximately in the middle of a respective support 6, as it can be clearly seen in FIG. 2. Therefore, a scale, which is formed of a plurality of graduation carriers 2 and a plurality of supports 6, which are connected with a measured object only by an elastic connection 10, would have an increased mechanical stability.

The length ratio of the supports 6 and the graduation carriers 2 should be so selected that a longer part has a length which is an integral multiple of the length of a shorter part. This would insure that the butt joint of longer parts would be essentially located in the middle of a shorter part, which would permit to achieve the maximal stability of the scale.

It is possible to so form the supports 6 that they would have the same shape as the graduation carriers 2 without the graduation. The same shape of both the graduation carriers 2 and the supports 6 permits to form them by substantially the same manufacturing process which substantially facilitate their manufacturing and storage.

Figure 3A:
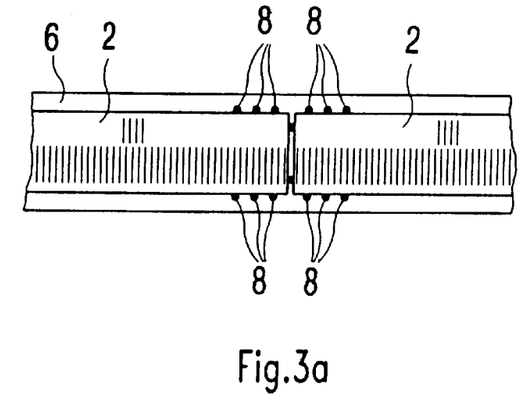
FIG. 3a is a schematic view of a scale with a rigid connection in the area of the butted joint.
Figure 3B:
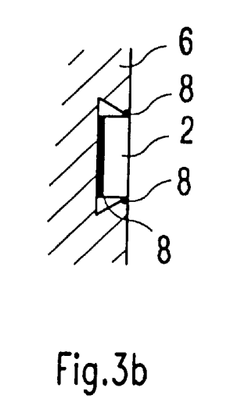

FIGS. 3a and 3b illustrate a further possible connection of the graduation carriers 2 with supports 6. After the graduation carriers 2 are connected with a support 6 by a long-lasting elastic glue connection 8, the graduation carriers 2, after an appropriate adjustment, are fixed on the support 6 with a welding connection.

To form an optimal welding connection, without the graduation carriers 2 and, thus, the scale being deformed as a result of the welding process, the graduation carriers 2 are inserted in a dovetail-shaped groove formed in the support 6, as shown in FIG. 3b. The groove depth corresponds to the height of the graduation carriers 2 so that a common smooth surface of both the graduation carriers 2 and the support 6 is formed. The advantage of the particular shape of the support groove consists in that during the welding process, on one hand, little material of the support 6 is melted and, on the other hand, the heat dissipation via the support 6 is very small. A further advantage of the groove shape consists in that the graduation carriers 2 can be easily inserted into the groove, without the need to precisely form the longitudinal surfaces of the graduation carriers 2.

The welding connection 12 is essentially provided in the region of both ends of the graduation carriers 2 in order to insure an adjustable gap between two graduation carriers 2. No welding connection in the gap between two graduation carriers 2 is contemplated, in particular, in the graduation region.

A further alternative to forming elastic and fixed connection between the graduation carriers 2 and the support 6, is realized by the use of clamping, as shown in FIGS. 4a, 4b, 5a, and 5b.

Figure 4A:
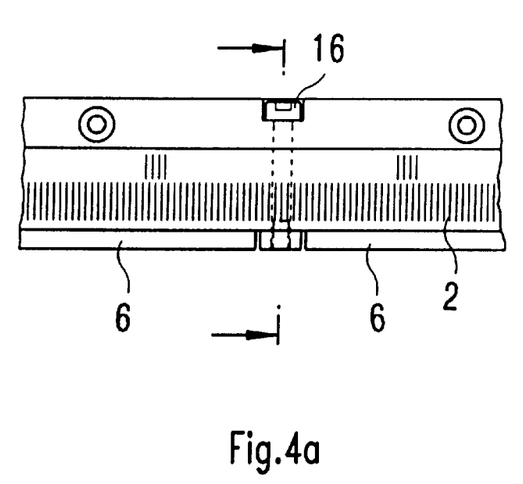
FIG. 4a is a schematic view illustrating a clamping attachment of the graduation carrier.
Figure 4B:
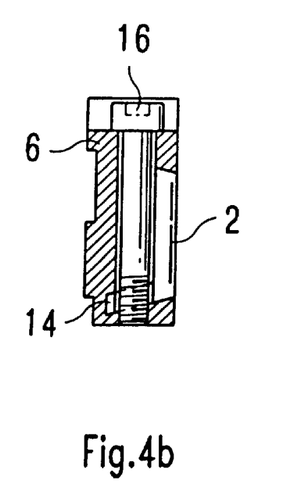

A clamping connection is shown in FIGS. 4a–4b. At that, the support 6 has, on its upper surface, a dovetail-shaped groove for receiving a graduation carrier 2, with the trapezoidal shape of the graduation carrier 2 corresponding to the shape of the groove. Then, a second groove 14 is provided in the support 6. The groove 14 extends parallel to the longitudinal extent of the support 6 and is separated in two sections connected with a thin material bridge.

With this shape, during the tightening of the screw 16 the thread of which engages in the outer section of the portion of the support 6 which is almost severed by the groove 14, a bending torque acts on the material bridge, and the dovetail-shaped groove, in which the graduation carrier 2 is inserted, is diminished. This diminishing of the support groove 14 leads to the clamping connection of the graduation carrier 2 with the support 6. Because of the trapezoidal shape of the graduation carrier 2 and the shape of the associated groove 14, the graduation carrier 2 is additionally pressed into the groove 14 upon tightening of the screw 16.

Figure 5A:
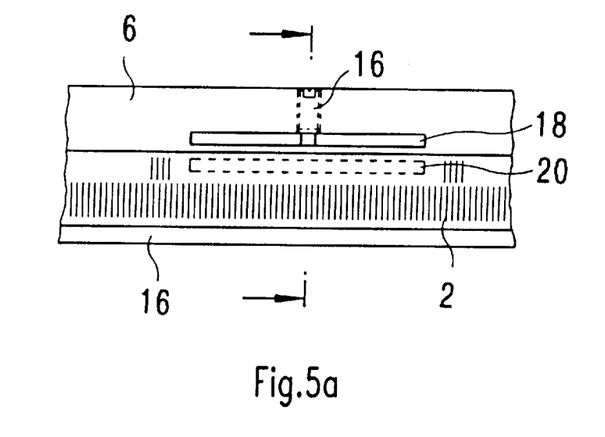
FIG. 5a is a schematic view illustrating another embodiment of a clamping attachment of a graduation carrier.
Figure 5B:
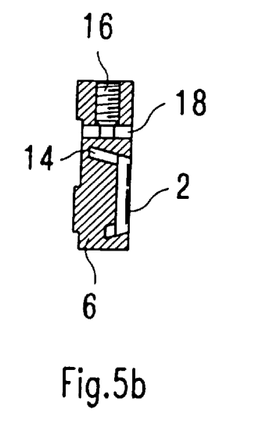

In this embodiment, both the elastic and fixed connections are realized with the same means. When the tightening torque of the screw 16 is below a threshold value, an elastic connection is formed which provides for a limited displacement of the graduation carrier 2, which enables its adjustment. With an increased screw tightening torque, the same means insures a fixed or stationary connection. The bottom of the support 6 is so formed that during the attachment of the support 2 to the measured object or during mounting of the support in a housing, the entire bottom does not lie on the measured object, rather certain bearing surfaces, which extend parallel to the longitudinal extent of the support 6, are formed thereon, as shown in FIGS. 5a and 5b. Because of this, increased requirements to the surface quality of the bearing surfaces of the support 6 and the measured object can be reduced to a certain extent, and the entire bottom of the support 6 and the bearing surface of the measured object need not to have an increased surface quality. From this, it follows that the size of the bearing surfaces advantageously should be selected as small as possible but not smaller than it is necessary for insuring a reliable connection.

When two bearing surfaces are provided on the support 6, the connection means for attaching the support 6 to the measured object are usually arranged between the two bearing surfaces so that both bearing surfaces are pressed against the machine bed as a result of attachment of the support 6. If the attachment is effected with a screw means, the screws are tightened with a predetermined torque to insure an optimal contact between the support 6 and the measured object. Further, one of the support bearing surfaces is arranged immediately below the graduation provided on the graduation carrier 2. Thereby, it is insured that the graduation does not have any shifting.

Another embodiment of a clamping connection is shown in FIG. 5b. Here, the support 6 likewise has two grooves. A first groove has a dovetail shape and the graduation carrier is inserted into this groove. A second groove 14 separates a section of the support 6 from the rest of the support 6, leaving a thin material bridge. Further, a slot 18 is formed in the support 6. A screw 16 is arranged in the middle of the slot 18 in such a manner that it is pressed against a portion of the support when screwed in, whereby the dovetail-shaped groove, in which the graduation carrier 2 is located, is diminished here also. With this connection, a reduced tightening torque provides for an elastic connection of the graduation carrier 2 with the support 6, and a large tightening torque provides for their fixed or stationary connection. Due to the trapezoidal shape of the graduation carrier 2 and the dovetail shape of the associated groove, the graduation carrier 2 is additionally pressed into the groove during tightening of the screw 16.

Instead of the second groove 14, a second slot 20, as shown in FIG. 5a, can be provided. However, the second slot 20 need not extend along the entire length of the support 6.

Figure 6A:
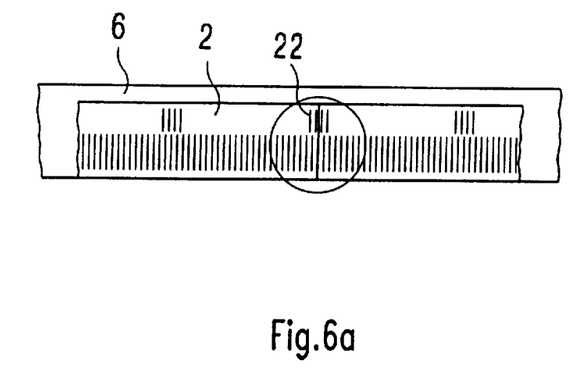
FIG. 6a is a schematic view illustrating an advantageous arrangement of a reference mark on a graduation carrier.
Figure 6B:
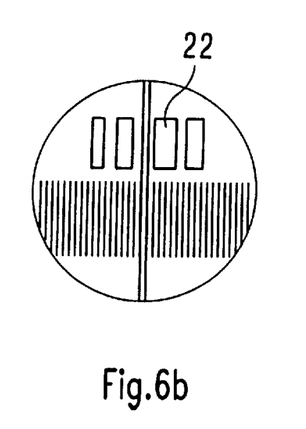
FIG. 6b is a view showing a detail of FIG. 6a at an increased scale.

It proved to be advantageous to provide a reference mark 22 in the region of the gap between two graduation carriers 2 which carry an incremental graduation, as shown in FIGS. 6a and 6b. Thereby an absolute position can be established at the gap by the measuring system, whereby errors, which eventually would occur as a result of a gap between two graduation carriers 2, would have an effect only in a very small region adjacent to the gap.

During manufacturing of any of the above described modular scales, first, graduation carriers 2 are connected with one or more supports 6 by an elastic connection 8. Then the graduation carriers 2 are so adjusted that the gap width at the butt joint of two graduation carriers 2 amounts to a most possible extent to an integral multiple of a graduation period of the graduation provided on the graduation carriers 2. This is very important because usually when the graduation of a scanning reticle of a measuring head overlaps the graduations of the two graduation carriers 2 at their butt joint, there exists an offset with respect to the graduation of one of the graduation carrier. This offset can lead to a measuring error.

Experiments have shown that deviations of a gap width between two graduation carriers 2 of an order of ±5% of a graduation period can still be accepted. This means that for a graduation period of, e.g., 20 $\mu$m, the gap width between two graduation carriers 2 should be adjusted to an accuracy of 2 $\mu$m.

As soon as the gap width is adjusted, the gap width is fixed by an elastic second stationary connection with a high modulus of elasticity. The second connection can, e.g., be formed with a slow hardening epoxy glue which provides for a stationary connection along the entire length of the graduation carrier 2. The advantage of this consists in that the first elastic connection can also be realized with the same epoxy glue, because it requires a certain time for its hardening. Actually, no two different connections are formed. Rather, the elastic connection passes into the fixed connection due to further hardening of the glue. Even when a clamping connection is used, an elastic or fixed connection can be simply effected by adjusting the tightening torque of the screws.

Alternatively, the first elastic connection can be effected using a permanently elastic glue, and the second fixed connection with a high modulus of elasticity, in particular in the region of the butt joint of two graduation carriers 2, can be effected by welding the graduation carriers 2 to the support or supports 6.

After the gap between the graduation carriers 2 is fixed, the scale can be attached to the measured object. This attachment is effected with a third, permanently elastic connection, so that different temperature-dependent expansion of the measured object and the scale do not lead to constraining forces.

The elastic third connection can be realized with a strip having glue on its opposite sides and placed between the measured object and the support 6.

Alternatively, an elastic connection of the measured object with the support 6 can be achieved by form-lockingly connecting them, as shown in FIGS. 5a and 6a. At that, the support 6 is so formed that its form-locking connection with the measured object is insured. At that, naturally, one side of the scale must be fixed.

Figure 7:
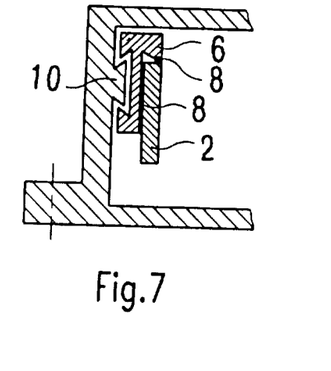
FIG. 7 is a cross-sectional view illustrating an elastic form-locking connection of a graduation carrier with a support.
Figure 8:
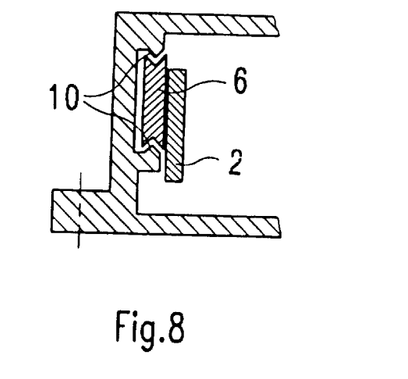
FIG. 8 is a cross-sectional view illustrating another embodiment of an elastic form-locking connection of a graduation carrier with a support.
Figure 9:
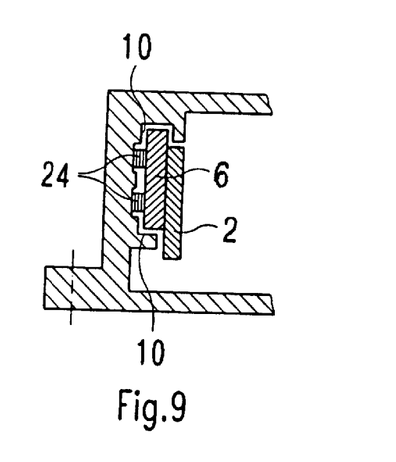
FIG. 9 is a cross-sectional view illustrating an elastic magnetic connection of a graduation carrier with a support.

A magnetic connection, which is shown in FIG. 7, also can be used for elastically connecting the scale with a measuring object. At that, a magnet 24 is provided either in the support 6, or in the measured object, or there-between, with the support 6 or/and the measured object being formed of a magnetizable material. Thereby, the magnetic field of the magnet 24 provides for an elastic connection 10 between the measured object and the scale.

Figure 10:
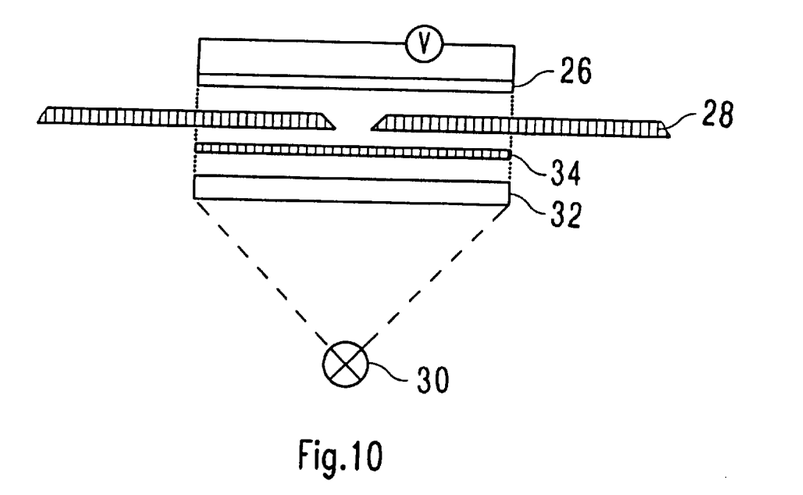
FIG. 10 is a schematic view illustrating a measuring head.

A suitable measuring head for the inventive linear measuring system for photo-electrical scanning in accordance with the transmitted light principle is schematically shown in FIG. 10. When scanning in accordance with the reflection principle takes place, a photo element 26, which lies behind the scale 28, is simply arranged in front of the scale 28. The measuring head, which is shown in FIG. 10, includes a light source 30, a condenser 32, and a scanning reticle 34 on which a grating structure having the same graduation as the scale 28, is provided. The photo element 26 also formes part of the measuring head. The scale 28, as it has already been discussed above, is arranged between the scanning reticle 34 and the photo element 26.

When the measuring head is displaced above the scale 28, the overlapping of the graduations of the scanning reticle 34 and the scale 28, results in formation of the light-dark pattern on the photo element 26 which generates a corresponding voltage V the frequency of which changes dependent on the displacement speed and the graduation period. When a gap of a butt joint of two graduation carriers 2 of the scale 28 lies in the region of the scale 28 which is being scanned with scanning reticle 34 and the photo element 26, then in the region of the gap, only the graduation of the scanning reticle 34 would be mapped on the photo element 26, as there is no graduation in this region of the scale 28. This results in increased light incidence on the photo element 26, and the voltage, which is generated by the photo element 26, increases by the same amount, until the gap is displaced outside of the scanning area. The high-frequency portion of the voltage V, which occurs during the displacement, does not change, because most of the scale scanned regions have a graduation thereon, and a scanned region is always large in comparison with the gap width. Therefore, it does not matter whether the measurement is based on a transmission through or a reflection of the scale 26. It further does not matter if the scale 28 has a butt location without any graduation, because the light can be completely transmitted or reflected or its transmission or reflection is completely prevented. In both cases, the permanent part of the voltage V changes.

Though the present invention was shown and described with references to the preferred embodiments, various modifications thereof will be apparent to those skilled in the art and, therefore, it is not intended that the invention be limited to the disclosed embodiments or details thereof, and departure can be made therefrom within the spirit and scope of the appended claims.

What is claimed is:

1. A linear encoder, comprising:
   a modular scale having support means, and a plurality of graduation carriers mounted on the support means and arranged one behind another in a longitudinal direction, with the support means and the graduation carriers having substantially same coefficients of thermal expansion, and with the graduation carriers having knife-shaped butt junction surfaces; and
   a measuring head for scanning the scale.

2. A linear encoder, comprising:
   a modular scale having a plurality of supports arranged one behind another in a longitudinal direction, and a plurality of graduation carriers mounted on the plurality of supports and arranged one behind another in the longitudinal direction, with the supports and the graduation carriers having substantially same coefficients of thermal expansion, and with butt joints of adjacent supports being offset from butt joints of adjacent graduation carriers; and
   a measuring head for scanning the scale.

3. A linear encoder according to claim 2, wherein butt junction surfaces of the supports are knife-shaped.

4. A linear encoder according to claim 2, wherein the supports and the graduation carriers have identical outer dimensions.

5. A linear encoder according to claim 2, wherein a butt joint of adjacent graduation carriers are located approximately in a middle of a longitudinal extent of a respective support.

6. A linear encoder according to claim 1, wherein a reference mark is provided at a butt joint of adjacent graduation carriers.

7. A linear encoder according to claim 2, wherein a reference mark is provided at each butt joint of adjacent graduation carriers.

8. A linear encoder according to claim 1, wherein an elastic connection between the graduation carriers and the support means is effected with glue.

9. A linear encoder according to claim 1, comprising connection means for fixedly connecting the graduation carriers to the support means at the butt junction surfaces of the graduation carriers, and wherein a gap between adjacent carriers has a width substantially equal to an integral multiple of a graduation period.

10. A linear encoder according to claim 2, comprising connection means for fixedly connecting the graduation carriers to the support means at the butt junction surfaces of the graduation carriers, and wherein a gap between adjacent carriers has a width substantially equal to an integral multiple of a graduation period.

11. A linear encoder according to claim 9, wherein the connection means comprises one of a welding joint, a clamp joint and a slow hardening glue.

12. A linear encoder according to claim 10, wherein the connection means comprises one of a welding joint, a clamp joint and a slow hardening glue.

13. A linear encoder according to claim 1, wherein the measuring head has at least one row of a plurality of graduation periods extending in a longitudinal direction of the graduation carriers so that, during scanning, a plurality of graduation periods are mapped with one of a reflected signal and a transmitted-through signal.

14. A linear encoder according to claim 13, further comprising means for scanning the graduation periods provided on the measuring head, the scanning means being capable of simultaneously scanning from 100 to 10,000 graduation periods.

15. A linear encoder according to claim 1, wherein the support means have two bearing surfaces for abutting one of a measured object and a housing, and wherein one of the bearing surfaces is so arranged that another of the bearing surfaces is pressed against the one of the measured object and the housing as a result of connection of the support means with the one of a measured object and a housing.

16. A linear encoder according to claim 15, wherein the another of the bearing surfaces is located immediately beneath a graduation provided on the graduation carriers.

17. A linear encoder according to claim 15, wherein the bearing surfaces extend in a longitudinal direction of the support means and are smaller than a base surface of the support means.

18. A linear encoder, comprising:
    a modular scale having support means, and a plurality of graduation carriers mounted on the support means and arranged one behind another in a longitudinal direction, with the graduation carriers having knife-shaped butt junction surfaces; and
    a measuring head for scanning the scale.

19. A linear encoder, comprising:
    a modular scale having a plurality of supports arranged one behind another in a longitudinal direction, and a plurality of graduation carriers mounted on the plurality of supports and arranged one behind another in the longitudinal direction, with butt joints of adjacent supports being offset from butt joints of adjacent graduation carriers; and
    a measuring head for scanning the scale.

20. A linear encoder according to claim 18 wherein graduations are provided on upper surfaces of the graduation carriers, and wherein the knife-shaped butt junction surfaces are formed as side surfaces of the respective graduation carriers with knife-shaped edges of the knife-shaped butt junction surfaces being located at the upper surfaces of respective graduation carriers.

21. A linear encoder, comprising a modular scale having support means, and a plurality of graduation carriers mounted on the support means and arranged one behind another in a longitudinal direction, wherein the support means has a dovetail-shaped groove formed therein, and the graduation carriers are inserted in the dovetail-shaped groove.

22. A linear encoder according to claim 21, wherein the dovetail-shaped-groove has a depth corresponding to a height of the graduation carriers and forms a knife-shaped edge on a support means surface, and wherein the graduation carriers are fixed on the support means by welds formed in an area of the knife-shaped edge.

23. A linear encoder, comprising a modular scale including support means having a dovetail-shaped groove formed therein; graduation carrier means insertable in the dovetail-shaped groove of support means; and clamping means for fixing the graduation carrier means in the dovetail-shaped groove.

24. A linear encoder according to claim 23, wherein the clamping means comprises a second groove formed in the support means and extending parallel to a longitudinal extent of the support means and separated into two sections connected by a thin material bridge which is subjected to a bending torque upon insertion of the graduation carrier means into the dovetail-shaped groove, whereby a size of the dovetail-shaped groove is diminished, and a clamping connection of the graduation carrier means with the support means is formed.

25. A linear encoder according to claim 23, wherein the clamping means comprises a second groove formed in the support means and separating a section of the support means from a remaining portion of the support means, a thin material bridge connecting the separated section with the remaining portion, a slot formed in the support means and extending parallel to a longitudinal extent of the support means, and a screw arranged in the middle of the slot for applying pressure to the separated section of the support means reducing thereby a size of the dovetail-shaped groove, whereby a clamping connection of the graduation carrier means with the support means is formed.

* * * * *